(12) United States Patent
Björklund et al.

(10) Patent No.: US 11,351,460 B2
(45) Date of Patent: Jun. 7, 2022

(54) SYSTEM AND METHOD FOR CREATING PERSONALIZED GAME EXPERIENCES

(71) Applicant: Unity IPR ApS, Copenhagen (DK)

(72) Inventors: Kaj Mikael Björklund, Espoo (FI); Mikko Juhani Lehtinen, Helsinki (FI); Kaisa Hillervo Salakka, Helsinki (FI); Pavels Selin, Helsinki (FI); Daniel Zautner, Helsinki (FI)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 17/025,837

(22) Filed: Sep. 18, 2020

(65) Prior Publication Data

US 2021/0086082 A1 Mar. 25, 2021

Related U.S. Application Data

(60) Provisional application No. 62/903,461, filed on Sep. 20, 2019.

(51) Int. Cl.
*A63F 13/67* (2014.01)

(52) U.S. Cl.
CPC .................. *A63F 13/67* (2014.09)

(58) Field of Classification Search
CPC ... A63F 13/67; A63F 13/45; A63F 2300/6027
See application file for complete search history.

(56) References Cited

U.S. PATENT DOCUMENTS

| | | | | |
|---|---|---|---|---|
| 6,335,744 B1 * | 1/2002 | Korilis | ................... | G06Q 30/02 463/42 |
| 10,799,798 B2 * | 10/2020 | Aghdaie | ................. | A63F 13/67 |
| 2002/0022516 A1 * | 2/2002 | Forden | .................... | A63F 13/10 463/32 |
| 2003/0003975 A1 * | 1/2003 | Lynn | ................... | G06Q 30/0252 463/1 |
| 2003/0120542 A1 * | 6/2003 | Arning | ............... | G06Q 30/0235 705/14.35 |
| 2004/0148221 A1 * | 7/2004 | Chu | ................... | G06Q 30/0251 705/14.51 |
| 2007/0066403 A1 * | 3/2007 | Conkwright | .......... | A63F 13/803 463/43 |
| 2016/0067612 A1 * | 3/2016 | Ntoulas | ................. | A63F 13/537 463/29 |
| 2017/0136362 A1 * | 5/2017 | Bucher | ................... | A63F 13/79 |
| 2017/0228976 A1 * | 8/2017 | Chesworth | .......... | G07F 17/3244 |

* cited by examiner

*Primary Examiner* — Steve Rowland
(74) *Attorney, Agent, or Firm* — Schwegman Lundberg & Woessner, P.A.

(57) ABSTRACT

A method for optimizing a computer-implemented game for a target metric is disclosed. Based on a detecting that an optimization point has been reached during a runtime of the computer game, user data, game state data, and personalized gaming experience (PGE) question data is communicated to a PGE server. The PGE question data is linked to the optimization point. An answer corresponding to the PGE question data is received from the PGE server. The answer is selected from a plurality of answers linked to the optimization point based on an application of a machine-learned model to the user data, game state data, and PGE question data. The received answer is implemented within the computer-implemented game.

14 Claims, 7 Drawing Sheets

SYSTEM AND METHOD FOR CREATING PERSONALIZED GAME EXPERIENCES

CROSS-REFERENCE TO RELATED APPLICATIONS

This application claims the benefit of U.S. Provisional Application No. 62/903,461, filed Sep. 20, 2019, which is incorporated by reference herein in its entirety.

TECHNICAL FIELD

The subject matter disclosed herein generally relates to the technical field of computer systems and, in one particular example, to computer systems and methods for creating personalized gaming experiences.

BACKGROUND OF THE INVENTION

Video games are typically created with various fixed properties such as difficulty level, monetization targets, assets and the like. For example, a game may be created with 'easy', 'medium' and 'difficult' ability levels which may be chosen prior to game play but are typically fixed once the game has begun. Also, a game player would also typically be required to manually change a difficulty setting for a game. Even with a selected difficulty setting, one game player may find a game too difficult and have a poor experience, while another game player using the same setting may find the game boring and demand more of a challenge.

BRIEF DESCRIPTION OF THE DRAWINGS

Further features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1A:
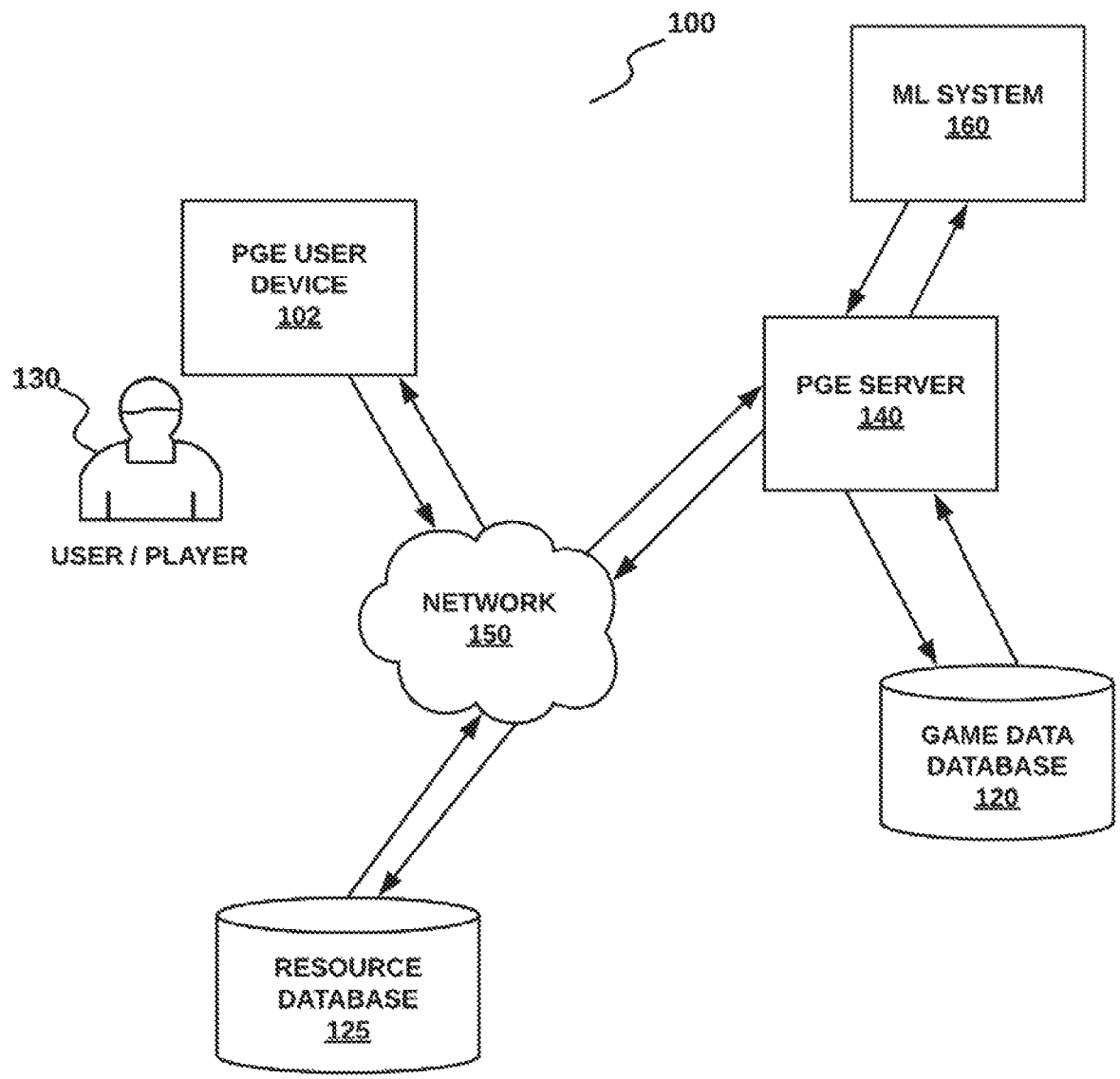
FIG. 1A is a schematic illustrating a personalized gaming experience (PGE) system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein is understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'game object', used throughout the description herein is understood to include any digital object or digital element within an environment. A game object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'game object' may also be understood to include linked groups of individual game objects. A game object is associated with data that defines properties and behavior for the object.

The terms 'asset', 'game asset', and 'digital asset', used throughout the description herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'build' and 'game build' used throughout the description herein should be understood to include a compiled binary code of a game which can be executed on a device, and which, when executed can provide a playable version of the game (e.g., playable by a human or by an artificial intelligence agent).

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or played by an artificial intelligence agent.

The terms 'client' and 'application client' used throughout the description herein are understood to include a software client or software application that accesses data and services on a server, including accessing over a network.

Throughout the description herein, the term 'agent' and 'AI agent' should be understood to include entities such as a non-player character (NPC), a robot, and a game world which are controlled by an artificial intelligence system or model.

A method for optimizing a computer-implemented game for a target metric is disclosed. Based on a detecting that an optimization point has been reached during a runtime of the computer game, user data, game state data, and PGE question data is communicated to a PGE server. The PGE question data is linked to the optimization point. An answer corresponding to the PGE question data is received from the PGE server. The answer is selected from a plurality of answers linked to the optimization point based on an application of a machine-learned model to the user data, game state data, and PGE question data. The received answer is implemented within the computer-implemented game.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Turning now to the drawings, systems and methods, including non-routine or unconventional components or operations, or combinations of such components or operations, for generating a personal gaming experience in accordance with embodiments of the invention are illustrated. In accordance with many embodiments, and shown in FIG. 1A is a personal gaming experience (PGE) system 100. The PGE system 100 includes a PGE user device 102, a PGE server device 140, and a machine learning system 160 in networked communication over a network 150. In accordance with an embodiment, the PGE system 100 includes a resource database 125 which may contain data describing game assets and data describing other resources that may be required by a video game executing on the PGE user device 102. In accordance with an embodiment, the PGE system 100 may include a Game Data database 120 that stores data from additional PGE systems that include additional PGE user devices (the additional PGE systems and additional PGE user devices are not shown in FIG. 1A).

In accordance with an embodiment, FIG. 1A shows a single user/player 130 and a single PGE user device 102; however, it should be understood that during operation a plurality of users 130 on a plurality of PGE user devices 102 may be in operation and in communication with the PGE server 140, and store data on the Game Data database 120 over the network 150.

Figure 2:
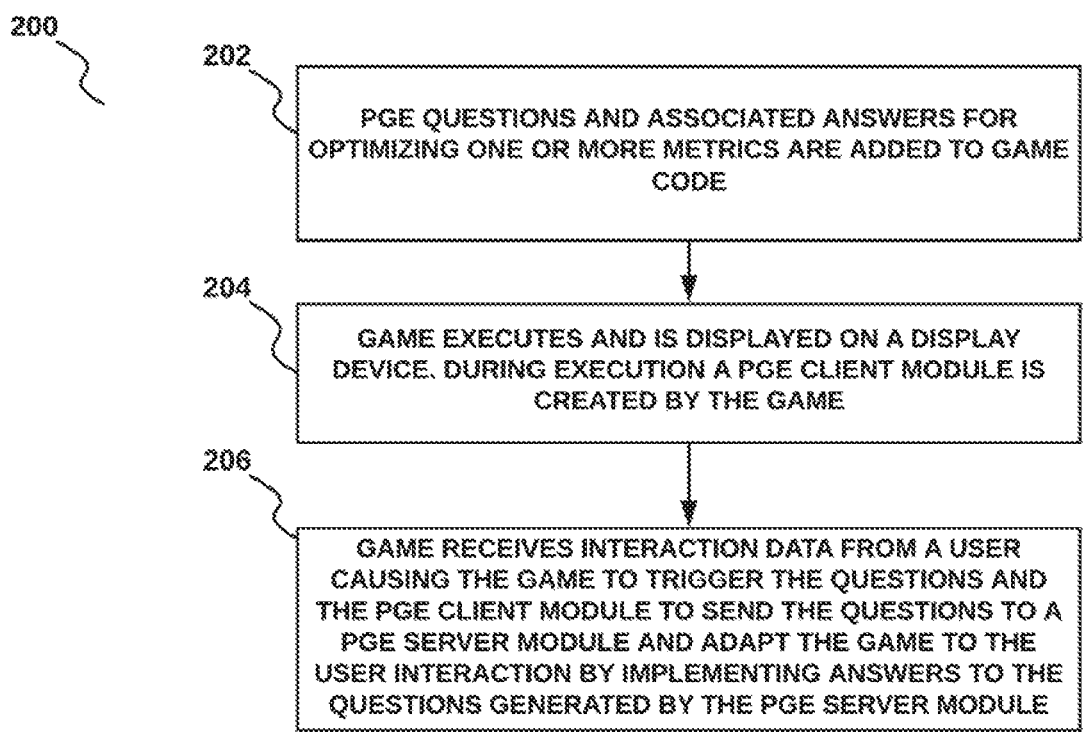
FIG. 2 is a schematic illustrating a method for implementing a PGE system, in accordance with one embodiment.
Figure 3:
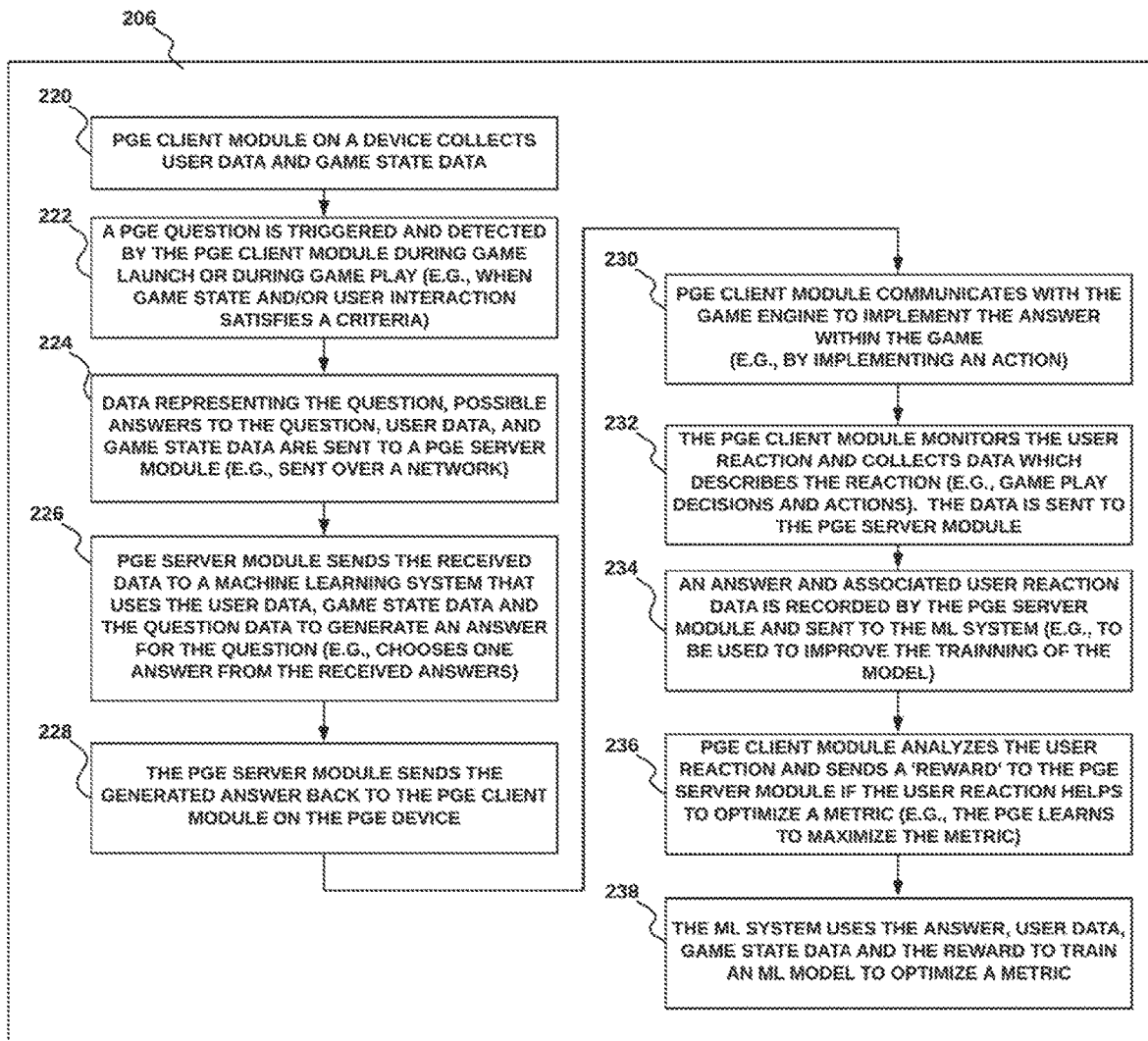
FIG. 3 is a schematic illustrating a method for optimizing a target metric using a PGE system, in accordance with one embodiment.

In accordance with an embodiment, the PGE system 100, when linked to a game (e.g., a video game running on a PGE user device 102), creates and then trains at least one machine learning (ML) model over time (e.g., as described with respect to the methods shown in FIG. 2 and FIG. 3). The training includes using data from playing of the game by a plurality of users 130 over time (e.g., user data, game data (e.g., including character progression, character location, character health, character movement, character actions, and the like), or other data described herein). Furthermore, the PGE system 100 causes the game to adapt over time, based on the ML model, using the methods described herein and shown in FIG. 2 and FIG. 3. The training of the at least one ML model over time allows an optimization of the game over time with respect to optimization targets defined within the game. In accordance with an embodiment, an optimization target is a metric that is to be optimized by the PGE system 10 (e.g., using the methods described with respect to FIG. 2 and FIG. 3). A metric may be any measurable aspect of a game that can be associated with the optimization target; for example a metric can be any quantifiable aspect of a game. Many metrics can be optimized with the systems and methods described herein. The optimization target is defined in part by setting criteria to trigger reward events (defined below) within a game when a player does a positive action towards optimization of the optimization target. The optimization targets may include metrics that represent a measure of user engagement within the game, metrics that represent a measure of satisfaction or enjoyment of users with respect to overall game experience or experiences within a game, metrics that represent a measure of retention of users within the game, metrics that represent a measure of revenue obtained from the game, and the like, wherein each of the metrics is quantified with a corresponding value (or a plurality of values). In accordance with an embodiment, the optimization (e.g., via the adaptation) of the optimization targets are personalized and dynamic for each user of the game (e.g., as described with respect to the method shown within FIG. 3). The optimization of the optimization targets is personalized based on the optimization being unique for each user. The optimization of the optimization targets is dynamic based on the optimization changing over time. In accordance with an embodiment, there is provided one ML model per game title which is created and trained with data from a plurality of game players on a plurality of PGE user devices 102. In accordance with another embodiment, there is provided one ML model per optimization target and per game title which is trained using data from a plurality of game players received from a plurality of PGE user devices 102.

Figure 1B:
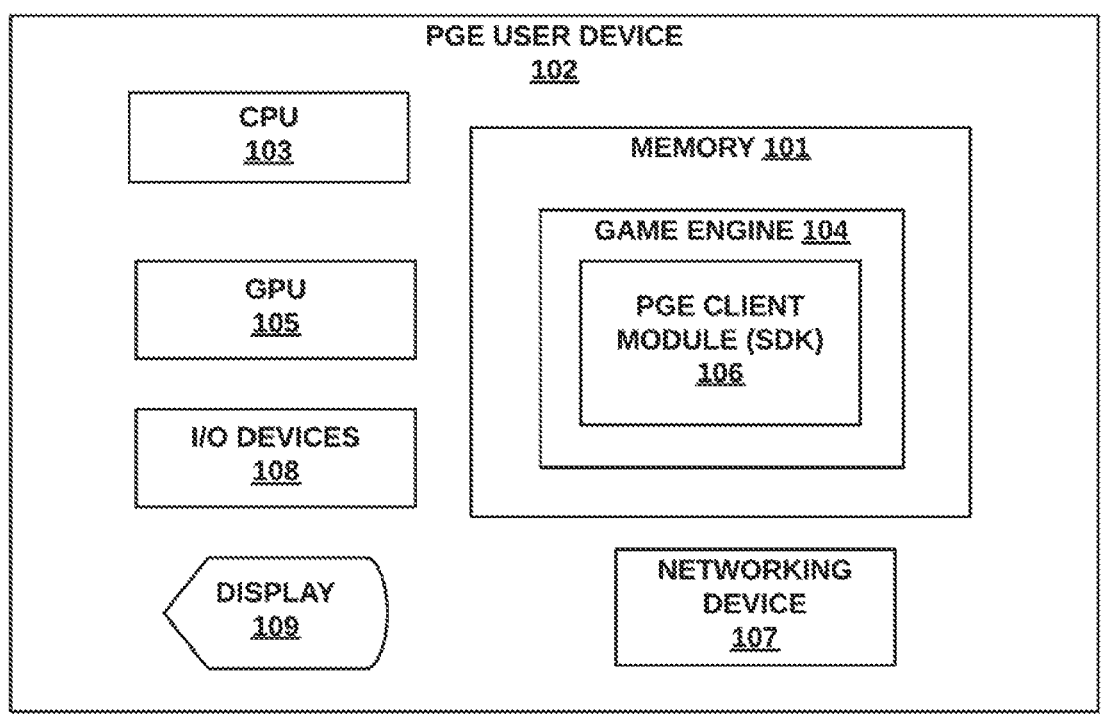
FIG. 1B is a schematic illustrating a PGE user device within a PGE system, in accordance with one embodiment.

In accordance with an embodiment and shown in FIG. 1B is a schematic showing details of a PGE user device 102 within a PGE system 100. The PGE user device 102 includes one or more central processing units 103 (CPUs), and graphics processing units 105 (GPUs). The CPU 103 (and the GPU 105) is any type of processor, processor assembly comprising multiple processing elements (not shown), having access to a memory 101 to retrieve instructions stored thereon, and execute such instructions. Upon execution of such instructions, the instructions implement the processing device 103 to perform a series of tasks as described below in reference to FIG. 2 and FIG. 3. The memory 101 can be any type of memory device, such as random-access memory, read only or rewritable memory, internal processor caches, and the like.

The PGE user device 102 also includes one or more input/output devices 108 such as, for example, a keyboard or keypad, mouse, pointing device, touchscreen, microphone, camera, and the like, for inputting information in the form of a data signal readable by the processing device 103. The PGE user device 102 further includes one or more display devices 109, such as a computer monitor, a touchscreen, and a head mounted display (HMD), which may be configured to display digital content including video, a video game environment, an integrated development environment and a virtual simulation environment to the user 130. The display device 109 is driven or controlled by the one or more GPUs 105 and optionally the CPU 103. The GPU 105 processes aspects of graphical output that assists in speeding up rendering of output through the display device 109. The PGE user device 102 also includes one or more networking devices 107 (e.g., wired or wireless network adapters) for communicating across a network.

The memory 101 on the PGE user device 102 also stores a game engine 104 (e.g., executed by the CPU 103 or GPU 105) that communicates with the display device 109 and also with other hardware such as the input/output device(s) 108 to present a 3D game environment (e.g., a video game) to the user 130. The game engine 104 would typically include one or more modules that provide the following: animation physics for game objects, collision detection for game objects, rendering, networking, sound, animation, and the like in order to provide the user with a video game (or simulation) environment. In accordance with an embodiment, the game engine 104 may be implemented within an application such as a video game.

In accordance with an embodiment, the memory 101 on the PGE user device 102 also stores a PGE client module 106 for implementing methods as described herein and in particular with respect to the methods shown in FIG. 2 and FIG. 3. The PGE client module 106 may be implemented for example as a software development kit (SDK).

Figure 1C:
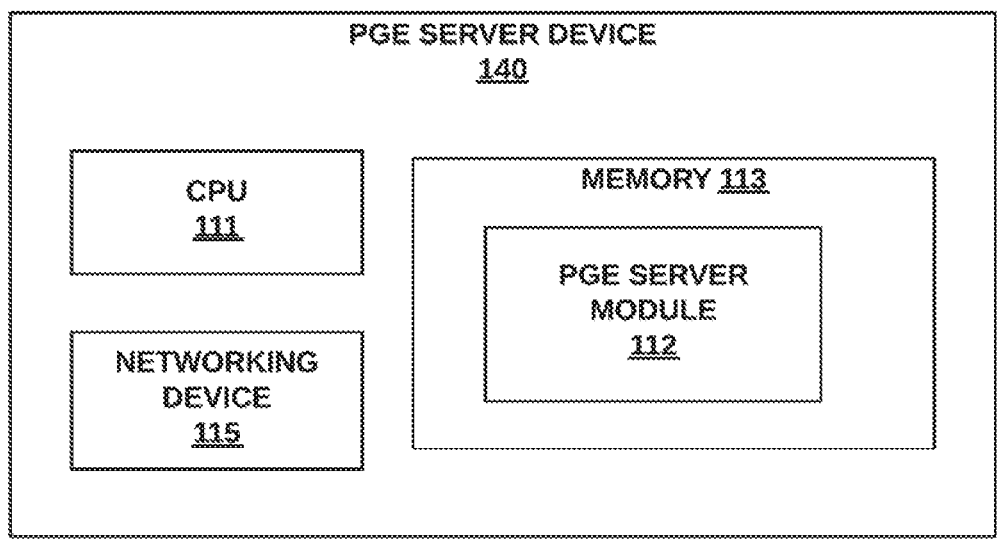
FIG. 1C is a schematic illustrating a PGE server device within a PGE system, in accordance with one embodiment.

In accordance with an embodiment and shown in FIG. 1C is a PGE server device 140. The PGE server device 140 includes one or more central processing units 111 (CPUs). The CPU 111 is any type of processor, processor assembly comprising multiple processing elements (not shown), having access to a memory 113 to retrieve instructions stored thereon, and execute such instructions. Upon execution of such instructions, the instructions implement the processing device 111 to perform a series of tasks as described below in reference to FIG. 2 and FIG. 3. The memory 113 can be any type of memory device, such as random-access memory, read only or rewritable memory, internal processor caches, and the like. The PGE server device 140 also includes one or more networking devices 115 (e.g., wired or wireless network adapters) for communicating across the network 150.

In accordance with an embodiment, the memory 113 on the PGE server device 140 also stores a PGE server module 112 for implementing methods as described herein and in particular with respect to the methods shown in FIG. 2 and FIG. 3. The PGE server module 112 may be implemented for example as a software development kit (SDK).

In accordance with an embodiment and shown in FIG. 2, there is provided a method 200 for creating a personalized gaming experience using PGE system 100. In accordance with an embodiment, at operation 202 of the method 200, a plurality of PGE questions and associated answers are added to game code within a video game (e.g., added to software instructions that when executed by a processor interact with the display device 109 and also with other hardware such as the input/output device(s) 108 to present a 3D game environment of the video game to the user 130). In accordance with an embodiment, a PGE question and associated answers are linked to an optimization point within the videogame (e.g., the optimization point may be described within the game code). An optimization point can include a location (e.g., 3D point or area within a video game environment of the video game which is being displayed on a display device 109) and a time (e.g., a time within the video game, an event within the video game, and the like). An optimization point can be linked to a progress of a user within the video game, such as a number of points (e.g., experience points) earned, a level of an achievement of a player character, or another measure of progress. An optimization point can represent a time and/or location within the video game (e.g., during a runtime of the game) wherein a decision can be made by the PGE system 100 and wherein the decision is made to optimize a metric. In accordance with an embodiment, a decision includes a process of choosing an answer for a PGE question. In accordance with an embodiment, aspects of the PGE system 100 may be included within a software development kit (SDK) and as part of operation 202, adding the PGE questions may be accomplished by implementing aspects of the SDK.

In accordance with an embodiment, at operation 204 of the method 200, the video game executes on a PGE user device 102 (e.g., game code executed by a CPU on the device and displayed on the display device 109) and, as part of the execution, a PGE client module 106 is created by the game (e.g., by execution of game code).

In accordance with an embodiment, at operation 206 of the method, the executing and displayed game receives input data describing an interaction with a player via the input/output devices 108. The interaction may include the user playing the video game on the PGE user device 102, the interaction causing the game to trigger PGE questions based on the interaction. In accordance with an embodiment, as part of operation 206, the PGE client module 106 communicates with the PGE server module 112 and adapts game play within the video game to the user interaction from operation 206 by implementing answers to the PGE questions received from the PGE server module 112. The communication including a sending of one or more PGE questions from the PGE client module 106 to the PGE server module 112, and receiving by the PGE client module 106 one or more answers associated with the one or more questions from the PGE server module 112.

A ML model within the ML system 160 can learn a correlation between any attribute (e.g., damage) and a reward provided for the implementation of an alternative associated with the attribute (reward is defined below). Data obtained over time from the PGE question (e.g., including answers received from the ML system 160 over time) and subsequent actions of a user (e.g., if the user continues to play the next level at a difficulty determined by the ML system 160) are used to train the ML system 160 and optimize the decision (e.g., the decision in operation 206 that includes a process of choosing an answer for a PGE question).

As an example of using the method 200, a developer of a video game can add an optimization point anywhere in the video game by adding a few lines of code that describe the following: a PGE question, answers to the PGE question, instructions for how the PGE question is triggered (e.g., based on a location during a runtime of the video game where the PGE question may be triggered or a time during a runtime of the video game when the PGE question may be triggered). For example, a PGE question regarding level difficulty could be triggered when a game level ends (e.g., when a game player reaches an endpoint of a level within the video game), and an answer to the level difficulty PGE question (e.g., received from a PGE server module 112) could be used to set a difficulty for a next level of the video game. Data obtained over time from the PGE question (e.g., including answers received from the ML system 160 over time) and subsequent actions of a user (e.g., if the user continues to play the next level at a difficulty determined by the ML system 160) are used to train the ML system 160 and optimize the decision (e.g., as described in more detail below with respect to operations 236 and 238).

PGE Question

In accordance with an embodiment, a PGE question includes data describing a problem to be solved using the PGE system 100 (e.g., and using methods described in FIG. 2 and FIG. 3). The PGE question data can include the following: a name, one or more alternatives, an answer type and an answer handler. In accordance with an embodiment, a PGE question also includes data defining an optimization point for locating the PGE question during a runtime of a game (e.g., in time and space).

In accordance with an embodiment, the name is a label for a type of PGE question to be solved. The name can be a string (e.g. level_difficulty). In accordance with some embodiments, the name must be unique within the video game.

In accordance with an embodiment, a PGE question alternative (or just 'alternative') includes data describing a plurality of answers for the PGE question. The alternative data can be in the form of an array of data, with each entry of the array corresponding to an answer for the PGE question. The data can also be in the form of a list of data, with each entry of the list corresponding to an answer for the PGE question. The format of the data within the alternative is not limited to arrays and lists. The data type within the alternative may be string, an alphanumeric character string, a number and the like. For example, an array may include strings as answers to the level_difficulty PGE question; e.g., including {"easy", "medium", "hard" } with "easy", "medium" and "hard" each being answers to the level_difficulty PGE question.

Alternative Attributes

In accordance with an embodiment, an alternative includes attributes that further help to describe the alternative. Alternative attributes may be analyzed by the PGE server module 112 using the ML system 160 to understand underlying similarities and other associations between a plurality of alternatives. The attributes can include labels that help define the alternative, and data that helps to describe the alternative. For example, within a game, an attribute can include a price for an item within the video game, a value for weapon damage, and label for item alignment (e.g., a label to group game objects). As a further example, a video game may have a plurality of weapons available for display to a player during game play, and the plurality of weapons may be divided into subgroups depending on an alignment attribute (e.g., some weapons may be "lawful" while other weapons are "chaotic"). Also, each weapon in the plurality of weapons may have a damage value as an attribute and a ML model within the ML system 160 can learn (e.g., as described in operation 206) a correlation between any attribute (e.g., damage) and a reward provided for the implementation of an alternative associated with the attribute (a reward and how the reward is provided is defined below). Furthermore, in accordance with an embodiment, a distribution frequency of attributes within the video game (e.g., distribution frequency with respect to game time and location within a game environment) is directly linked with how quickly and accurately a ML model within the ML system 160 learns to respond with answers (e.g., with the learning described below with respect to operation 238). For example, in a game there may be only a few label alignments such as "lawful" or "chaotic", but there can be dozens of different weapons within the two alignments, so a ML model within the ML system 160 obtains more data per alignment than per weapon. Accordingly, an optimization linked to label alignment can be learned faster and more accurately than an optimization linked to individual weapon types or preferences.

Answer Signature

In accordance with an embodiment, an answer may be signed for authenticity by the PGE server module 112. The signature allows the authenticity of the answer to be validated. The signature may be used to verify that a specific PGE question sent to the PGE client module 106 for a player at a time was answered by the PGE server module 112 for the player at the time. In accordance with an embodiment, as an example, a signature may be constructed using a JSON web token (JWT) signed with a public key associated with the PGE server module 112.

PGE Question Timeout

In accordance with an embodiment, a PGE question may include a value for a timeout (e.g., 5000 milliseconds), which will guarantee an answer within the timeout value of time. In accordance with an embodiment, if an answer for a PGE question takes longer than the timeout (e.g., in bad network conditions), a default answer or an empty answer may be returned or used by the PGE client module 106.

In accordance with an embodiment, a PGE question may include an answer type, wherein an answer type for a PGE question is an optional setting that defines whether the PGE client module 106 requires a new answer each time a PGE question is asked (e.g., triggered by game play at runtime), or whether it can accept a previously generated answer (e.g., from a cache within the memory 101 of the PGE user device 102). In accordance with an embodiment the answer type for a PGE question can be configured to require that a new answer be received every time the PGE question is triggered within the video game. Accordingly, an answer for a PGE question may vary with time, depending on data received by the PGE client module 106 (e.g., from a player) during game play. In accordance with another embodiment, the answer type may be configured to require that a PGE question receives an independent answer each time the same PGE question is triggered until the answer is used (e.g., implemented) by the PGE client module 106 during game play (e.g., until a use flag has been triggered for the answer using a use event as described below), after which, the PGE server module 112 will always return the same used answer.

In accordance with an embodiment, and shown in FIG. 3, are details describing a method for performing operation 206 of the method 200. At operation 220 of operation 206, the PGE client module 106 on a PGE user device 102 collects user data and game state data. In accordance with an embodiment, operation 220 is performed continuously whereby the PGE client module 106 collects user data and game state data over time (e.g., throughout game play). In accordance with an embodiment, the PGE client module 106 collects game state data at specific times within game play; for example, during an event (e.g., events as defined herein) and when a PGE question is triggered. As part of collecting user data within operation 220, the PGE client module 106 collects data describing a context within which a player is playing a game (e.g., data not related to actions within a game), including: data describing a software platform (e.g., operating system) on which the video game is being played, data describing a device on which the player is playing, data describing a language in which the player is playing, data describing a country in which the player is playing, data describing a time of the day at which a player is playing, and the like.

In accordance with an embodiment, data describing the player state (e.g., including actions that a player completes during a game runtime) can be collected by the PGE client module 106 via user attributes (e.g., a user attribute may be modified during a game by the game engine 104). A user attribute includes data associated with a user with respect to a playing of the game by the user; for example, a number of coins collected, a number of kills, a number of player character deaths, a win-lose ratio, an amount of player points collected, a type of control scheme (e.g., tactical), and the like. In accordance with an embodiment, user attributes are updated or added before, after or during an event within a game. For example, user attributes can be updated immediately before a PGE question is triggered, or immediately before a reward (described below) is sent to the PGE server module 112. In accordance with an embodiment, updating user attributes multiple times will override values for existing attributes.

In accordance with an embodiment, at operation 222 of operation 206, the PGE client module detects a triggering of a PGE question during game play (e.g., during a runtime). For example, the triggering may occur when game play and/or user interaction meets a criteria for triggering a PGE question at an optimization point as defined as part of operation 202 (e.g., a PGE question may be triggered when a game is started, when a player reaches a location in a game, when a player advances to a level or part of a level in a game, when a player performs an action, and the like). The criteria may be defined by a creator of the game and may be associated with a metric to be optimized (e.g., during creation of PGE questions in operation 202 of the method 200).

In accordance with an embodiment, at operation 224, data representing the PGE question and possible answers to the PGE question are sent to a PGE server module 112 (e.g., sent over a network to a server device containing the server module 112). In accordance with an embodiment, as part of operation 224, the PGE client module 106 also sends user data and game state data collected in operation 220 to the PGE server module 112. For example, the PGE client module 106 may create and send an HTTP request with the data to the PGE server module 112.

In accordance with an embodiment, at operation 226 of operation 206, the PGE server module 112 sends the received user data, game state data, and the PGE question data to a machine learning (ML) system 160. The ML system 160 analyzes the user data, game state data and the PGE question data to generate an answer for the received PGE question. In accordance with an embodiment, generating the answer may include choosing one answer from the answers provided at operation 202 and sent to the PGE player server module at operation 224. In accordance with an embodiment, generating the answer includes choosing an ML model from a plurality of ML models and using the chosen ML model to choose one answer from the answers provided. The choosing of the ML model is based on the PGE question and the optimization target.

In accordance with an embodiment, at operation 228 of operation 206, the PGE server module 112 sends the generated answer back to the PGE client module 106 on the PGE user device 102. In accordance with an embodiment, at operation 230 of operation 206, the PGE client module 106 implements the received answer within the game. In accordance with an embodiment, the implementation may include using data within the received answer to create an action within the game (e.g., using the game engine 104). In accordance with an embodiment, the action implements a PGE question alternative (e.g., from a PGE answer) within the game. For example, an action may include a changing of a difficulty level, a changing of a game speed, a changing of a number of enemy characters, a changing of a displayed element within a user interface, a changing of an advertisement (e.g., type, frequency), a changing of character power up availability, and the like. The implementation may include searching for and downloading data (e.g., assets and resources) from a database (e.g., from the resource database 125) in order to complete the implementation (e.g., to implement an action). In accordance with an embodiment, at operation 232 of operation 206, the PGE client module 106 monitors a user reaction to the implemented action and collects data to describe the reaction (e.g., data received via input devices 108 and game state data). For example, the reaction may include game play decisions and game play actions made by the user as captured by the input devices 108. As part of operation 232, data describing the reaction is sent to the PGE server module 112.

In accordance with an embodiment, at operation 234 of the operation 206, the answer (e.g., from operation 226) and data describing the user reaction (e.g., from operation 232) is recorded by the PGE server module 112 in order to improve a training of a ML model within the machine learning system 160 (e.g., wherein the training is described with respect to operation 238). In accordance with an embodiment, the answer and the reaction data may be sent over the network 150 and recorded in a game data database 120 (e.g., in order to be used for training as described with respect to operation 238). In accordance with an embodiment, the game data database 120 may be in communication with and receiving additional data (e.g., answer data and user reaction data) from an additional PGE system or an additional PGE user device (the additional PGE system and the additional PGE user device is not shown in FIG. 1A). The additional data may be used for training an ML model as described with respect to operation 238). In accordance with an embodiment, at operation 236, the PGE client module 106 analyzes the user reaction (e.g., by analyzing data gathered during operation 232) and based on the analysis, sends a reward (described below) back to the PGE server module 112 if the user reaction meets a criteria for optimizing a metric, wherein the reward may be used in training a ML model in the ML system 160. In accordance with an embodiment, at operation 238, the ML system 160 uses the user data, game state data, the answer data, and the reward data to train an ML model within the ML system 160 with the goal of maximizing the metric. The training may use any type of machine learning algorithms to create and train the ML model within the ML system 160. In accordance with an embodiment, as part of operation 238, there may be a plurality of ML models trained with data from a single game title. For example, there may be a training of one ML model per optimization target and per game title using the data (e.g., user data, game state data, answer data and reward data) from a plurality of game players on a plurality of PGE user devices 102. In accordance with another embodiment, as part of operation 238, there may be a training of one ML model per game title which is created and trained with data (e.g., user data, game state data, answer data and reward data) from a plurality of game players on a plurality of PGE user devices 102.

In accordance with an embodiment, the methods described with respect to FIG. 2 and FIG. 3 can be used to trigger multiple PGE questions simultaneously within a game (e.g., during a runtime of a game).

In various embodiments, some of the method elements shown and described with respect to FIG. 2 and FIG. 3 may be performed concurrently, in a different order than shown, or may be omitted.

In accordance with an embodiment, a 'player' as described throughout the method 200 may include a human player interacting via a user input device 108, and an AI agent trained to simulate a human player.

Events

In accordance with an embodiment, the PGE client module 106 and the PGE server module 112 use events to exchange data with each other and with the ML system 160. An event includes data that is extracted from the game (e.g., by the PGE client module 106) and then relayed by the PGE client module 106 to the PGE server module 112. An event allows the PGE client module 106 and the PGE server module 112 to acquire data (e.g., including the player reaction data from operation 232) on player reaction to a chosen alternative (e.g., answer). The event data can be used by the PGE server module 112 and be sent to the ML system 160 and used by the ML system 160 to train an ML model.

A Use Event

In accordance with an embodiment there is provided a 'use' event which includes data that when analyzed by the PGE client module 106, allows the PGE client module 106 to verify and track a use of an answer and/or a question (e.g., via a 'use function' which could be called once an answer is implemented within a game (e.g., during operation 230) and when a player interacts with an answer (e.g., during operation 232)). In accordance with an embodiment, an answer may be marked 'used' when the answer has been implemented within the game (e.g., at operation 230) or alternatively it may be marked 'used' after it has been reacted to by the user (e.g., at operation 232). For example, a PGE question involving level difficulty may be marked as 'used' when a player in a game changes a game level after the PGE question was triggered and an answer that described a chosen difficulty level was implemented (e.g., a difficulty level chosen by an ML model in operation 226).

A Reward Event

In accordance with an embodiment, a reward is an event which provides feedback data to the PGE server module 112 and which may be relayed to the machine learning system 160 to help the ML system 160 train a ML model for optimizing a metric (e.g., as described in operations 236 and 238). In accordance with an embodiment, a game may send a reward event to the PGE client module 106 when a player performs a desired positive action with respect to optimizing the metric. The desired positive action may be defined by a game creator (e.g., during operation 202). The reward event may be used as a signal to the PGE server module 112 and the ML system 160 that a desired outcome (e.g., the desired positive action) or user behavior has been achieved. In accordance with an embodiment, as part of operation 238, the machine learning system 160 analyzes data from one or more reward events to optimize a ML model (e.g., via training) which will in turn maximize the metric.

In accordance with an embodiment, a reward event may be placed in the game by the creator of the game (e.g., as a part of operation 202 of the method 200). In accordance with an embodiment, a reward event is associated with a PGE question. A game creator may choose the placement of reward events so as to optimize optimization targets. In accordance with an embodiment, as part of operation 202 of the method 200, a creator of a game may analyze the game (e.g., the game environment, gameplay, levels, and more) and analyze optimization points within the game in order to determine where (e.g., a location, a time, a game progression point) to place associated rewards within the game environment and to determine criteria for sending a reward from the PGE client module 106 to the PGE server module 112. In accordance with an embodiment, a PGE question should be chosen to help optimize an optimization target and a corresponding reward should be generated when a user action helps to optimize the metric.

In accordance with an embodiment, a use of a reward event during training of a ML model by the ML system 160 in operation 238 helps to determine a quality level for an answer previously generated within the ML system 160 (e.g., during operation 226). The reward events can signal positive actions from a player (e.g., via reaction data from operation 232) and may be used by the ML system 160 to train a ML model to generate higher quality answers in a future (e.g., when generating an answer for a next user or for a future time with the same user). In accordance with an embodiment, a reward event allows for an optimization of custom optimization targets via custom PGE questions that include custom reward events. For example, actions of a player may be captured within data of a reward event may signal to the ML system 160 a quality of previously provided answers (e.g., representing whether the PGE system 100 provided a good game experience for the user as measured by user reaction data gathered at operation 232).

In accordance with an embodiment, a reward may include a value wherein the value signifies a level of importance (e.g., a small value may represent a reward of minor significance, whereas a large value may represent a reward with major significance). The value and other data related to a reward event can be sent via attributes that are attached to the reward event. For example, based on an optimization target being player retention (e.g., optimizing retention of players for a game), then reward events that represent retention specific actions may be defined by a game creator while a game is being created (e.g., as part of operation 202) and then collected during a game (e.g., as part of operation 236).

In accordance with an example, when a game with an integrated PGE system 100 is first released (e.g., made available for playing), the PGE system 100 may not have enough data to properly train one or more models at the time or release. Accordingly, as part of the example, the PGE system 100 may be configured to make random choices when determining answers (e.g., as part of operation 226) for PGE questions until sufficient data is collected (e.g., as part of operation 232) for training the one or more models. Continuing with the example, once a predetermined amount of sufficient data is collected, a machine learning model may be trained on the data during operation 238, after which optimization may begin with use of the trained model in operation 226.

Example: Optimize Button Click

As an example of the PGE system 100 using the method 200 consider the following: for the PGE system 100 to optimize a metric that represents a probability of a player clicking a predetermined button within a game, a predetermined Reward Event may be sent (e.g., during operation 236) to the PGE server module 112 after a detection of a pushing of the button (e.g., during operation 232). For example, a game creator may have created different variations of an in-game notification promoting a new game feature, and wants to optimize for clicking of the notification (e.g., there may be different combinations of copy text and positioning of the notification). The different variations of the offer may be defined during operation 202. In order to optimize a clicking of the notification, a PGE question may be included in the game (e.g., during operation 202) with respect to the different variations. During game play (e.g., during a runtime of the game), when the notification is displayed to the user via a display device 109, a use event may be implemented to inform the PGE system 100 that an answer was displayed to the user. Furthermore, as part of the method 200, based on a detection of a clicking of the notification, a reward may be sent creating a feedback loop wherein the PGE system 100 learns (e.g., via operation 238) to display an optimal notification (e.g., chosen from the variation of notifications) for each user to maximize a clicking of the notification.

Example: Optimize Item Display

As another example of operation of the PGE system 100, consider a scenario wherein the PGE system 100 determines (e.g., via operation 226) one or more items from within a larger set of items to display on a display device during a playing of a game (e.g., during a game runtime). The PGE system 100 may be used in the scenario in order to optimize revenue acquired from users during a playing of the game (e.g., during a runtime of the game). As part of the example, an optimization target might include maximizing a total dollar value of in-app purchases (e.g., the total dollar value being a metric to be optimized). Accordingly, as part of the example, the following three reward events could be created within a game (e.g., as part of operation 202) to signify an input of revenue and allow the ML system 160 to train a model (e.g., in operation 238) to optimize the revenue: a first reward every time a player sees an advertisement, a second reward every time a player clicks the advertisement (e.g., plans to buy), and third reward after a purchase is made.

Example: Optimize Game Difficulty

As another example of operation of the PGE system 100, consider a use case wherein the PGE system 100 is used to optimize a metric representing a measure of difficulty of a game. For example, the PGE system 100 may be used to correct a situation wherein a creator of a game notices that players of the game are churning (e.g., leaving the game and not playing again) during a first level of the game which uses a medium speed configuration. A rate of the churning can be used as a metric (e.g., a measure of the rate of churning) in this example, and wherein optimizing the metric is associated with minimizing the churning rate. Additionally, to continue the example, the creator may receive feedback that the game is too easy for players that have played other similar games. A known method of changing game difficulty level is to manipulate a speed associated with the game (e.g., speed of evil characters, speed of main character, etc.). Another known method of changing game difficulty level is to manipulate power up probabilities (e.g., making it difficult for a character to acquire items which provide increased power within a game). Continuing with the example, the game creator may use the known methods of changing game difficulty described above to create PGE questions (e.g., during operation 202 of the method 200) that may adjust game difficulty using the PGE system 100 with a goal of reducing the churning. One method of optimizing game difficulty (e.g., speed and power up probabilities) using the method 200 and the PGE system 100, includes measuring an increase of PGE answers related to engagement and retention. For example, optimizing a difficulty of a game using the PGE system 100 may keep a user playing the game longer and/or more often since an optimal difficulty level determined using the PGE system 100 and the method 200 can increase enjoyment of the game. As an example, using the PGE system 100 and method 200 on collected data associated with a new player, the PGE system 100 can select (e.g., during operation 226) an optimal first time experience (e.g., optimal speed) for the player based on a training of an ML model (e.g., via operation 238). Furthermore, a retention associated with a game may be measured by linking a reward with a start of a game and setting retention as an optimization target (e.g., by controlling PGE questions and rewards created during operation 202).

Continuing with an example of optimizing game difficulty using game speed and power up probability, as part of operation 202, the game creator may create tiers of values that applied to alternatives for corresponding PGE questions. For example, a set of alternatives for a PGE question regarding game speed can be created to include four tiers: a first "slow" tier with one or more low numerical speed values (e.g., or range of low values) which is meant for weak game players, a second "medium" tier with one or more medium numerical speed values (e.g., or range of medium values) which is meant for an average player, a third "fast" tier with one or more larger numerical speed values (e.g., or range of large values) which is made for better than average players, and a fourth "very fast" tier with one or more very large numerical speed value (e.g., or range of very large values) which is meant for very strong players. As a continuation of the example, a set of alternatives for a PGE question regarding the probability of receiving a game power up can include four tiers: a first "rare" tier with a low numerical probability (e.g., 5%) or range of low probabilities, a second "normal" tier with a medium numerical value of probability (e.g., 50%) or range of medium probabilities, a third "often" tier with a higher numerical value of probability (e.g., 75%) or range of higher probabilities, and a fourth "very often" tier with a very high numerical probability (e.g., %100) or range of very high probabilities. While only four tiers are shown for each of the example power up and speed PGE questions, it should be understood that any number of tiers and PGE questions are possible.

In accordance with an embodiment, once the tiers are created, one or more PGE questions regarding speed and power up may be triggered (e.g., and detected during operation 222) during the game runtime and wherein answers to the PGE questions (e.g., generated during operation 226) are implemented (e.g., during operation 230) as per the method 200 shown in FIG. 2 and FIG. 3.

In accordance with an example, determining an opening of a Leaderboard by a player during a game runtime could be used as a measure of engagement for the player by indicating a curiosity about their skill. Accordingly, using the PGE system 100 and method 200, a first reward event can be linked (e.g., during operation 202) to buttons or functions during the game runtime that display the Leaderboard or populate the Leaderboard with data.

In accordance with an example, determining a watching of an advertisement (e.g., by a player of a game) to obtain a life for the game could be used as a metric to indicate a desire of a player to continue within a game (e.g., the metric may be used as a measure of desire and represents another indication of engagement). Also, the watching of the advertisement can be used as a metric of revenue (e.g., a measure of revenue), which is valuable to track and optimize. Accordingly, one or more PGE questions may be linked (e.g., during operation 202) to the displaying of the advertisement and the PGE system 100 and method 200 may be used to optimize the metrics related to the watching and the displaying.

In accordance with an embodiment, there are many metrics that can be optimized with the method 200 and PGE system 100 described herein. For example, a plurality of game parameters (e.g., including dynamic level difficulty, progression and balancing) can be optimized in order to change a playing of a game for a player of the game. As another example, a plurality of game assets (e.g., within a resource database 125) can be analyzed by the PGE system 100 using PGE questions in order to determine an optimum set of assets from the plurality of assets to display for a user (e.g., the assets may include visual assets, art assets, character assets, and the like). As another example, a plurality of resources (e.g., resource bundies' can be analyzed by the PGE system 100 using PGE questions in order to determine an optimum resource of the plurality of resources to provide to a user during a game runtime. As another example, a custom user interface and user experience can be optimized using the PGE system 100 and PGE questions in the method 200 in order to determine an optimum color scheme, layout or other design elements for each player (e.g., including a look and feel, navigation, and positioning). As another example, feature prioritization and toggling can be optimized using the PGE system 100 and the method 200 in order to determine an optimum game feature to display (e.g., displaying an enabled butt-on) during a game runtime. As another example, content for a tutorial can be optimized using the PGE system 100 and the method 200 in order to determine an optimum tutorial for a player (e.g., including tutorial length, level of tutorial detail, and difficulty of the tutorial).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
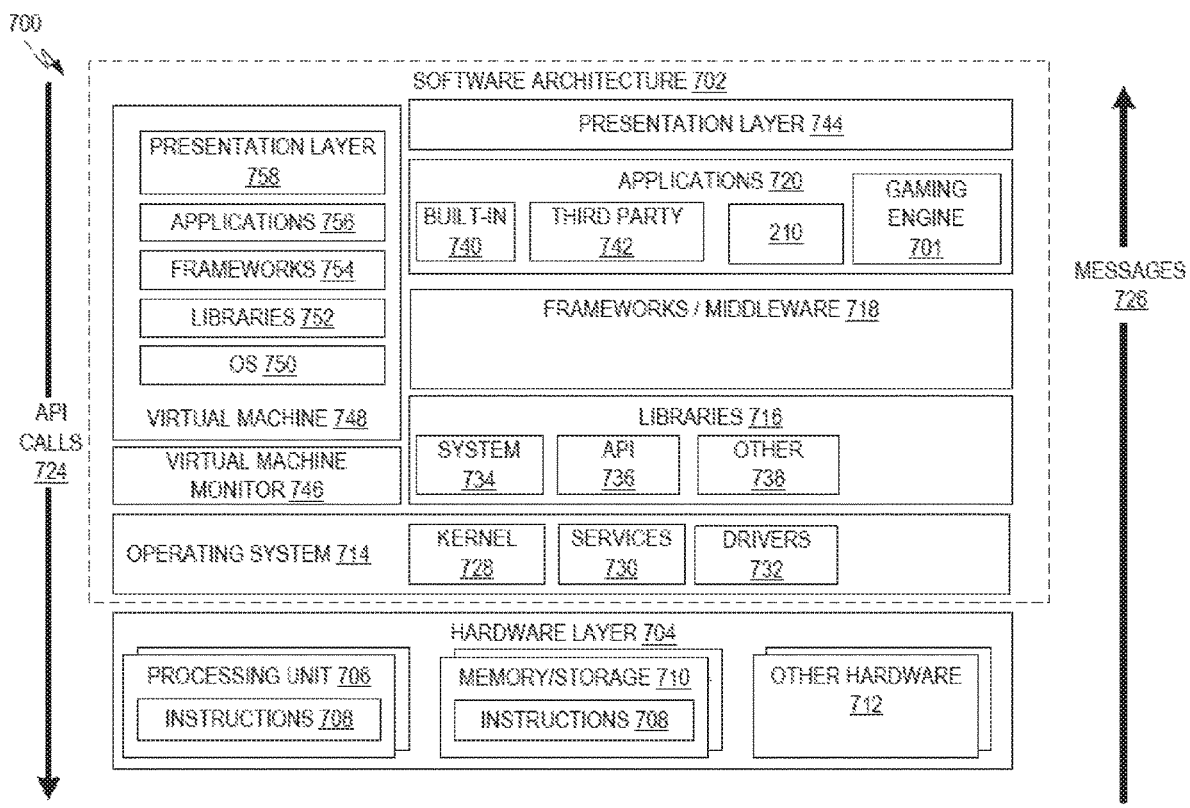
FIG. 4 is a block diagram illustrating an example software architecture, which may be used in conjunction with various hardware architectures described herein.

FIG. 4 is a block diagram 700 illustrating an example software architecture 702, which may be used in conjunction with various hardware architectures herein described to provide a gaming engine 701 and/or components of the PGE system 100. FIG. 4 is a non-limiting example of a software architecture and it will be appreciated that many other architectures may be implemented to facilitate the functionality described herein. The software architecture 702 may execute on hardware such as a machine 800 of FIG. 5 that includes, among other things, processors 810, memory 830, and input/output (I/O) components 850. A representative hardware layer 704 is illustrated and can represent, for example, the machine 800 of FIG. 5. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 4, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS®, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 4, this is illustrated by a virtual machine 748. The virtual machine 748 creates a software environment where applications/modules can execute as if they were executing on a hardware machine (such as the machine 800 of FIG. 5, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 5:
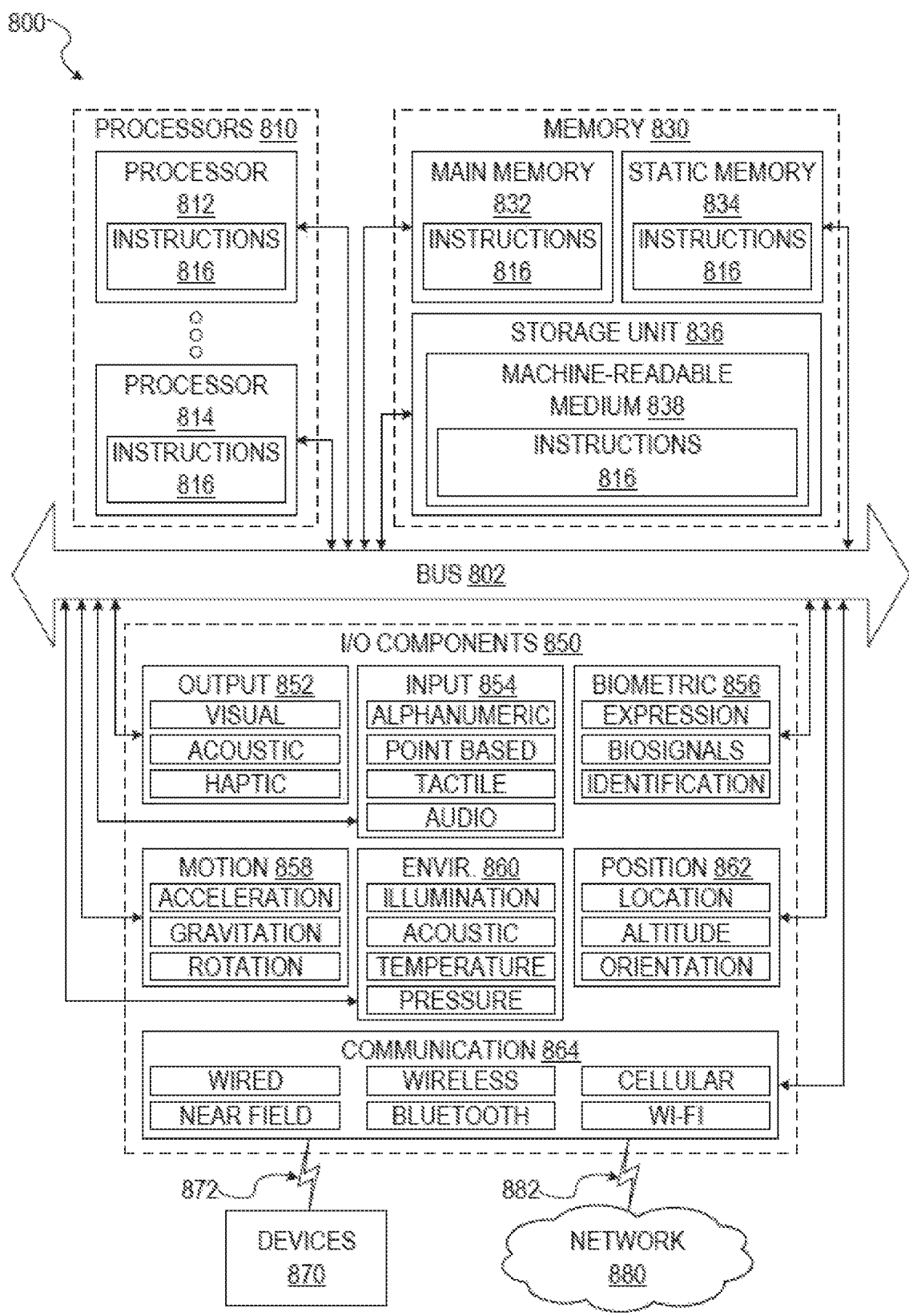
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 5 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 5 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 5. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
   one or more computer processors;
   one or more computer memories;
   a set of instructions incorporated into the one or more computer memories, the set of instructions configuring the one or more computer processors to perform operations for optimizing a computer-implemented game for a target metric, wherein the target metric relates to a measurable aspect of the computer-implemented game associated with a predetermined optimization target, the operations comprising:

based on a detecting that an optimization point has been reached during a runtime of the computer game:

detecting a desired positive action with respect to the target metric from within the computer-implemented game, the desired positive action being associated with an input to the computer-implemented game and specified within a reward event;

communicating user data, game state data, PGE question data, and reward data to a PGE server, the PGE question data being linked to the optimization point, wherein the reward event, the PGE question data, and the optimization point are predetermined to be associated with the predetermined optimization target;

receiving an answer corresponding to the PGE question data from the PGE server, the answer selected from a plurality of answers linked to the optimization point based on an application of a machine-learned model to the user data, game state data, and PGE question data, wherein the answer is further generated based on an application of the machine-learned model to the reward data; and implementing the received answer within the computer-implemented game; and communicating reward data from the reward event to the PGE server.

2. The system of claim 1, wherein the machine learned model is further trained using the user data, game state data, PGE question data and reward data associated with the optimization point.

3. The system of claim 1, wherein the desired positive action is predetermined to measure a reaction to the implemented answer, the reaction originating from a player of the computer-implemented game.

4. The system of claim 1, wherein the implementing of the received answer includes modifying an aspect of the game at the optimization point based on instructions within the PGE question data.

5. The system of claim 1, wherein the optimization point is associated with one or more of a location, a time, and a measure of progression within the computer implemented game.

6. The system of claim 1, wherein the computer-implemented game includes a plurality of target metrics linked to a plurality of predetermined optimization targets, and wherein each predetermined optimization target of the plurality of predetermined optimization targets has an associated machine learned model and a set of associated PGE questions.

7. A non-transitory computer-readable storage medium comprising a set of instructions that, when executed by one or more computer processors, cause the one or more computer processors to perform operations for optimizing a computer-implemented game for a target metric, wherein the target metric relates to a measurable aspect of the computer-implemented game associated with a predetermined optimization target, the operations comprising:

based on a detecting that an optimization point has been reached during a runtime of the computer game:

detecting a desired positive action with respect to the target metric from within the computer-implemented game, the desired positive action being associated with an input to the computer-implemented game and specified within a reward event;

communicating user data, game state data, PGE question data, and reward data to a PGE server, the PGE question data being linked to the optimization point, wherein the reward event, the PGE question data, and the optimization point are predetermined to be associated with the predetermined optimization target;

receiving an answer corresponding to the PGE question data from the PGE server, the answer selected from a plurality of answers linked to the optimization point based on an application of a machine-learned model to the user data, game state data, and PGE question data, wherein the answer is further generated based on an application of the machine-learned model to the reward data; and implementing the received answer within the computer-implemented game; and communicating reward data from the reward event to the PGE server.

8. The non-transitory computer-readable storage medium of claim 7, wherein the machine learned model is further trained using the user data, game state data, PGE question data and reward data associated with the optimization point.

9. The non-transitory computer-readable storage medium of claim 7, wherein the desired positive action is predetermined to measure a reaction to the implemented answer, the reaction originating from a player of the computer-implemented game.

10. The non-transitory computer-readable storage medium of claim 7, wherein the implementing of the received answer includes modifying an aspect of the game at the optimization point based on instructions within the PGE question data.

11. The non-transitory computer-readable storage medium of claim 7, wherein the optimization point is associated with one or more of a location, a time, and a measure of progression within the computer implemented game.

12. The non-transitory computer-readable storage medium of claim 7, wherein the computer-implemented game includes a plurality of target metrics linked to a plurality of predetermined optimization targets, and wherein each predetermined optimization target of the plurality of predetermined optimization targets has an associated machine learned model and a set of associated PGE questions.

13. A method comprising:

performing, using one or more computer processors, operations for optimizing a computer-implemented game for a target metric, wherein the target metric relates to a measurable aspect of the computer-implemented game associated with a predetermined optimization target, the operations comprising:

based on a detecting that an optimization point has been reached during a runtime of the computer game:

detecting a desired positive action with respect to the target metric from within the computer-implemented game, the desired positive action being associated with an input to the computer-implemented game and specified within a reward event;

communicating user data, game state data, PGE question data, and reward data to a PGE server, the PGE question data being linked to the optimization point, wherein the reward event, the PGE question data, and the optimization point are predetermined to be associated with the predetermined optimization target;

receiving an answer corresponding to the PGE question data from the PGE server, the answer selected from a plurality of answers linked to the optimization point based on an application of a machine-learned model to the user data, game state data, and PGE question data, wherein the answer is further generated based on an application of the machine-learned model to the reward data; and implementing the received answer within the computer-implemented game; and communicating reward data from the reward event to the PGE server.

14. The method of claim 13, wherein the implementing of the received answer includes modifying an aspect of the game at the optimization point based on instructions within the PGE question data.

* * * * *